Patented July 5, 1932

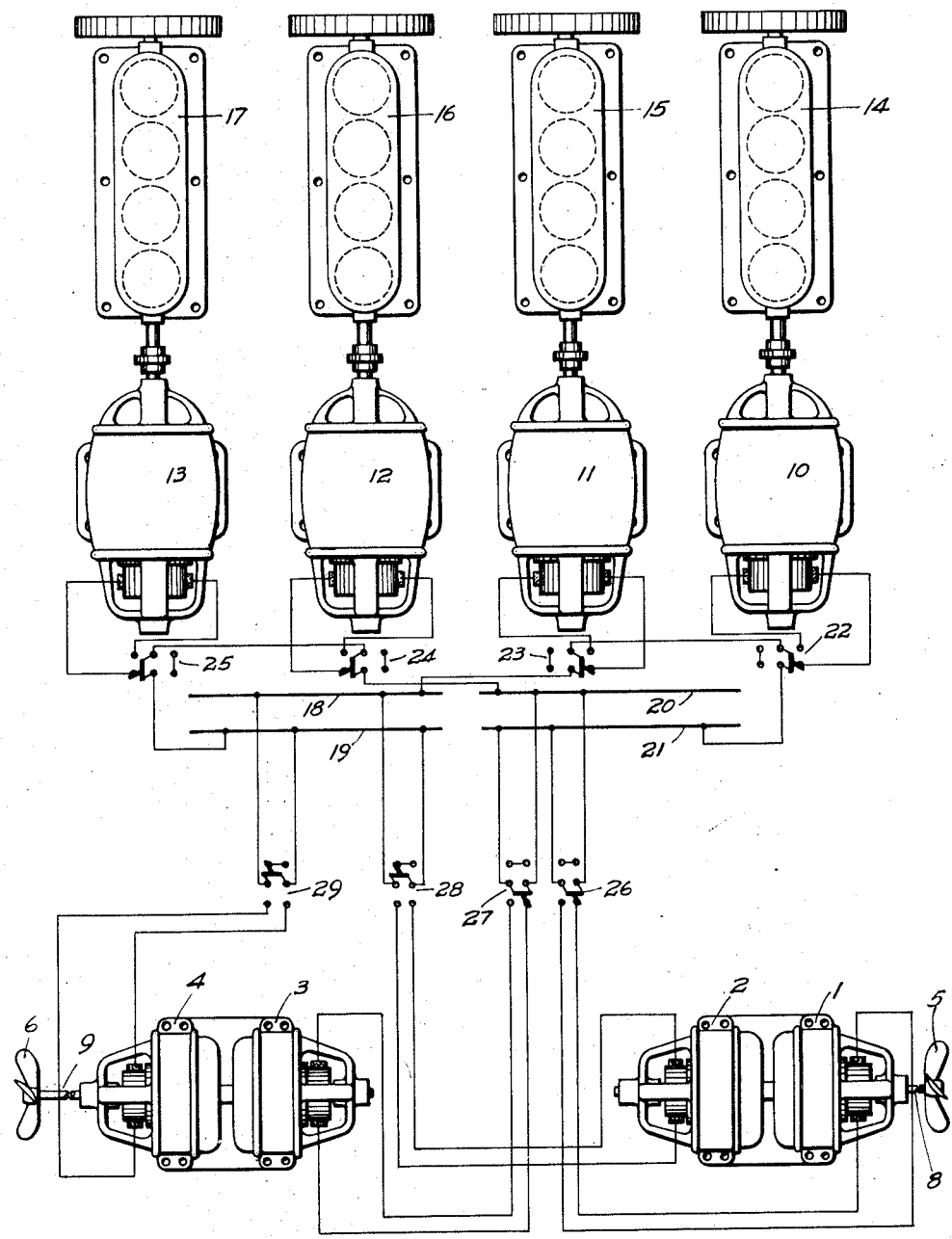

1,865,980

UNITED STATES PATENT OFFICE

WALTER E. THAU, OF NEW YORK, N. Y., ASSIGNOR TO WESTINGHOUSE ELECTRIC & MANUFACTURING COMPANY, A CORPORATION OF PENNSYLVANIA

CONTROL SYSTEM

Application filed September 19, 1927. Serial No. 220,584.

This invention relates to systems of distribution and it has particular relation to systems in which current is supplied directly by generators to motors that may be permanently in circuit relation thereto.

The object of the invention, generally stated, is to provide, in a power system utilizing a plurality of generating units and motors, for operating the system at a voltage strain substantially equal in value to one half or less of the total voltage generated.

It is also an object of my invention to provide a power system in which a plurality of motors and generators are interconnected in such manner as to insure the operation of the system when some of the units of the system fail.

It is common practice, in supplying energy to a number of motors connected in a power system in which the load may be excessive for one generator, to connect the motors across a number of generators connected in series, which usually results in a high-voltage system. If, in order to avoid utilizing a high-voltage system, the generators are connected in parallel relation, a complicated system of control for regulating the load on the generators is required.

With a view to avoiding these undesirable features and, at the same time, reduce the cost of equipment, as well as the undesirability of having high-voltage conductors in a system, the motors and generators of a power system, when connected in accordance with this invention, are disposed in alternate-circuit relation, making it possible to attain the required power supply at a voltage substantially equal to that of one generator and to control the same in a simplified manner.

When it is desired to drive certain devices requiring a considerable amount of power, it is sometimes advisable, where electrically driven units are employed, to make use of two small motors instead of one large motor. The invention may be applied to systems in which a plurality of compound motorized units are operated from a source of current constituting a part of independent system, such, for example, as in the operation of ferry boats where propeller screws are provided at both ends of the ship and two motors are mechanically connected to each propeller shaft to drive them. In such installations, it is necessary to generate the energy required for the motors on the ferry.

The method adopted in this invention for connecting the propeller motors and the supply generators in circuit relation, provides for operating the ship under the most adverse circumstances, such as the failure of various units, it being possible to operate the ship by a single motor and a single generator in operating condition.

My invention will be more completely understood when the following description is taken in conjunction with the accompanying drawing, the single figure of which is a diagrammatic view of circuits and apparatus embodying my invention, as applied to a ferry boat.

In the interests of simplicity in illustration, only the main circuits of the system have been shown. An illustration of the various field circuits, has been deemed unnecessary since any type of direct-current apparatus well known in the art may be employed for controlling the excitation of the machines.

In the system illustrated, a plurality of motors 1, 2, 3 and 4 are employed to drive the ship's propellers 5 and 6 which are connected to the motors by means of shafts 8 and 9, respectively, the two motors 1 and 2 being mechanically connected to the propeller 5 by means of the shaft 8 and the other two motors 3 and 4 being mechanically connected to the propeller 6 by means of the shaft 9. Motors 1 and 3 are in parallel with each other; similarly motors 2 and 4 are in parallel with each other. Motors 1 and 3 and motors 2 and 4 are in series relation.

In order to generate the current to operate the motors, a plurality of generators 10, 11, 12 and 13 are utilized, and, in this embodiment of the invention, the generators are driven by internal-combustion engines 14, 15, 16 and 17.

In the circuit illustrated, two sets of bus bars 18 and 19, and 20 and 21, from which the motor supply is taken, are alternately interspersed in series relation with the generators, the generating units 10 and 11 being connected in series relation with each other and the bus bars 18 and 21, and the generators 12 and 13 being connected in series relation with each other and the bus bars 19 and 20. It will be seen, therefore, that any current supplied from either bus bar, such, for example, as the current taken by the propeller motors will pass through the entire set of generators inasmuch as they are connected in a loop circuit.

One motor of a pair is connected to one set of bus bars and the other motor unit of the same pair is connected to the other set of bus bars; a like arrangement being employed for the two remaining motors and the bus bars. The system illustrated shows motors 1 and 3 connected to the bus bars 20 and 21, and the motors 2 and 4 connected to the bus bars 18 and 19. The object of this method of connecting the motors is to divide the load between motor combinations 1 and 3, and 2 and 4, it being customary in double ended ferry boats to drive the forward propeller at such speed as will neither assist nor retard the ships progress under which condition it requires only a relatively small input of power.

Inasmuch as the bus bars 18 and 19 and 20 and 21 are alternately interspersed in series-circuit relation with the generators 10, 11, 12 and 13, the maximum voltage strain on the system is reduced to substantially that of one supply unit, which may be but one generator, but, in this case, it is that of two generators connected in series, which, however, is just one half what it would be if all the generators were directly connected in series-circuit relation. Another feature of this method of operation is that it is effective, irrespective of the speed or the load upon either the motors 1 and 2 as compared with the load on the motors 3 and 4, inasmuch as motors 1 and 2 and motors 3 and 4 drive independent shafts connected to independent propellers.

It will be noted that, if any of the generators fail for any reason, by means of the switches illustrated they may be disconnected from the circuit and the remaining generators operated to propel the boat satisfactorily. Switch 22 may be used to cut generator 10 from the system, and, by the use of the switch 23, the generator 11 may be likewise cut out of the system. If both switches 22 and 23 are moved to the generator out of circuit positions at the same time, the two generators 10 and 11 will be cut out of the system, making the generators 12 and 13 carry the load. In a similar manner, generators 12 and 13 may be cut out of the circuit by means of switches 24 and 25.

It will also be observed that the motors 1, 2, 3 and 4 may be disconnected from the circuit by means of the switches 26, 27, 28 and 29, respectively.

As shown in the drawing, these switches are in the open position and may be actuated to engage their lower contact members to connect their respective motors to the sets of bus bars.

As will be readily understood, if it is desired to merely disconnect one motor of each pair connected to different sets of bus bars, as motors 1 and 4, it is only necessary to open the switch which is associated with either or both of these motors. If, however, it is desired to disconnect any two motors which are connected to the same set of bus bars, it is necessary to close a connecting circuit between the bus bars of that set, in order that the main power circuit will still be closed.

In order to provide these connecting circuits, the switches 26 to 29, inclusive, are provided with upper contact members which are connected together so that, if either or both of switches 28 and 29, for example, are actuated to their upper positions, the bus bars 18 and 19 are connected together and likewise in the case of switches 26 and 27.

It is to be understood, however, that the switches 27 to 29 are to be actuated to their upper positions only in the event it is desired to disconnect both motors from the same set of bus bars. Any one motor may be disconnected by merely opening its associated switch without closing it in the opposite direction.

While I have illustrated and described a particular embodiment of my invention, it is intended that all matter contained herein shall be interpreted as illustrative and not in a limiting sense, since, manifestly, the same may be considerably varied without departing from the spirit of my invention, as set forth in the appended claims.

I claim as my invention:

1. In a distribution system, in combination with a plurality of sets of mechanically coupled motors, a plurality of generators for supplying electric energy to the motors, means for electrically connecting one motor in each set of the motors in parallel circuit relation with one motor of each of the other sets and an electrical circuit comprising the parallel connected motors and the generators disposed alternately in series relation.

2. In a distribution system, in combination, a plurality of sets of mechanically coupled motors, a plurality of sources of current for supplying the motors, means for electrically connecting one motor in each set of motors in parallel circuit relation with one motor in each of the other sets of motors, and an electrical circuit comprising the parallel connected motors and sources disposed alternately in series relation.

3. In a ship propulsion system, in combination, two propellers with a pair of motors mechanically coupled to each propeller, two sets of bus bars and generators for supplying voltage thereto, means for electrically connecting one of the motors coupled to each propeller to one set of bus bars, means for connecting the other motor coupled to each propeller to the other set of bus bars, a separate source of supply for each set of bus bars, and an electric circuit comprising the bus bars and the separate sources distributed alternately in series circuit relation.

4. In a ship propulsion system, in combination with a plurality of propelling elements, a plurality of motors for driving each propeller, and a plurality of supply units equal in number to the number of propellers for supplying the energy to the motors driving the propellers, a plurality of means for distributing the energy utilized in the system, one motor on each propeller being connected to each distributing means, a circuit comprising the supply units and the distributing means alternately disposed in series circuit relation.

5. In a ship propulsion system, in combination, a plurality of propellers for driving the ship, a plurality of motors for driving each propeller, a plurality of sets of series-connected generators for supplying power to the propeller motors, a plurality of sets of bus bars for distributing the power in the system, some of the motors on each propeller being connected to one set of bus bars and the remaining motors of each set being connected to another set of bus-bars, said generator sets being connected alternately in series-circuit relation with the sets of bus bars, whereby power may be supplied to each group of propeller motors from two separate sources.

6. In a ship propulsion system, in combination, a plurality of propellers for driving the ship, a plurality of motors for driving each propeller, a plurality of motor-generator power units for supplying power to the propeller motors, a plurality of sets of bus-bars for connecting the generators to the motors, said generators being connected in pairs in series relation to opposite bus bars of separate sets, and one half the number of motors connected to each propeller being connected in parallel-circuit relation to each set of bus bars.

7. In a power-distribution system, in combination, a plurality of sets of mechanically-coupled motors, a plurality of sets of bus bars, means for connecting a motor of each set in parallel-circuit relation to one set of bus bars, means for connecting another motor of each set in parallel-circuit relation to a different set of bus bars, a plurality of power-supply units, and means for connecting the sets of bus bars and power-supply units alternately in series-circuit relation, whereby motors of different sets are connected in the main series circuit in parallel with respect to one another and the system caused to operate at a voltage equal to that of a single power-supply unit.

In testimony whereof, I have hereunto subscribed my name this 9th day of September, 1927.

WALTER E. THAU.